Dec. 6, 1932.                D. R. THOMAS                1,889,939
                               TRAILER
                         Filed June 15, 1929          2 Sheets-Sheet 1
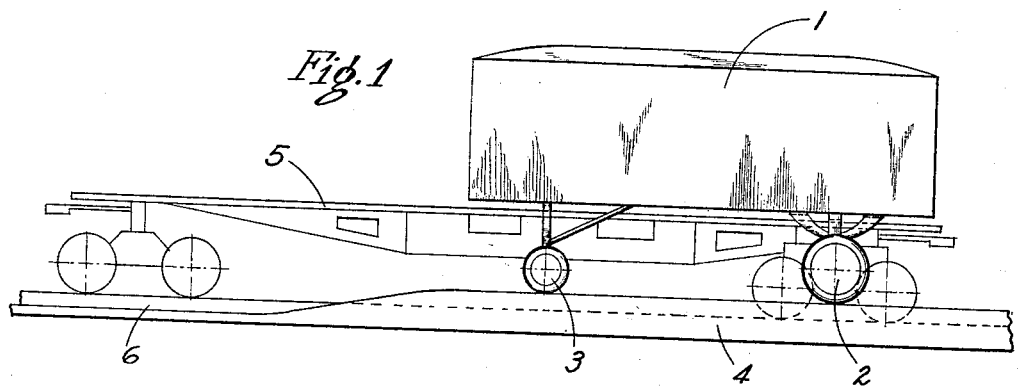
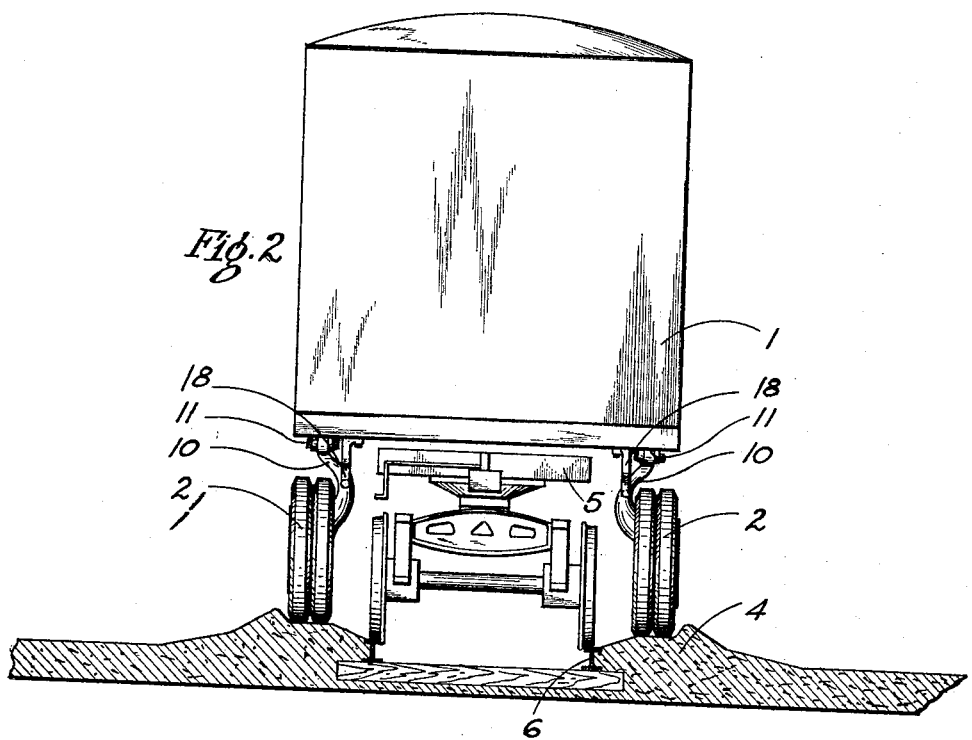
Inventor
DAVID R. THOMAS
By
        Attorneys Dec. 6, 1932.  D. R. THOMAS  1,889,939
TRAILER
Filed June 15, 1929  2 Sheets-Sheet 2
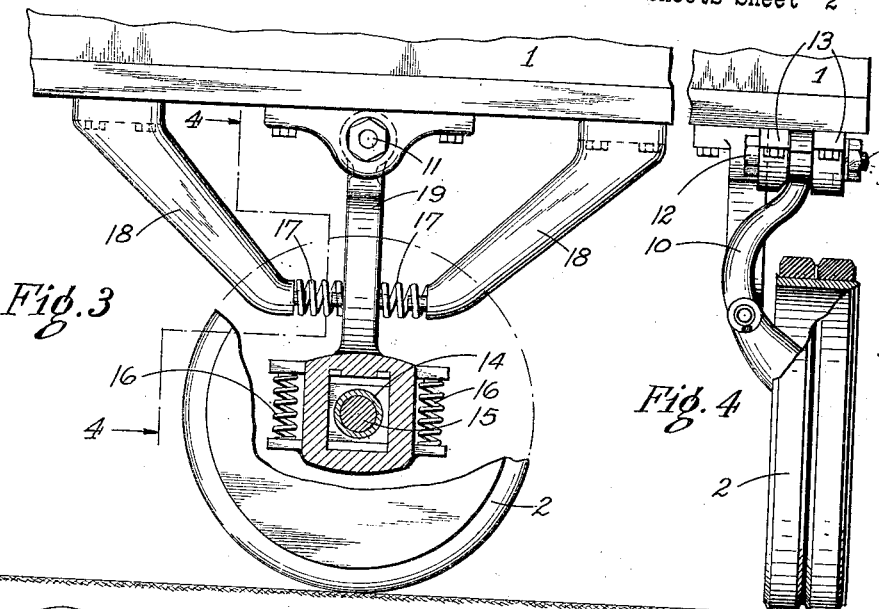
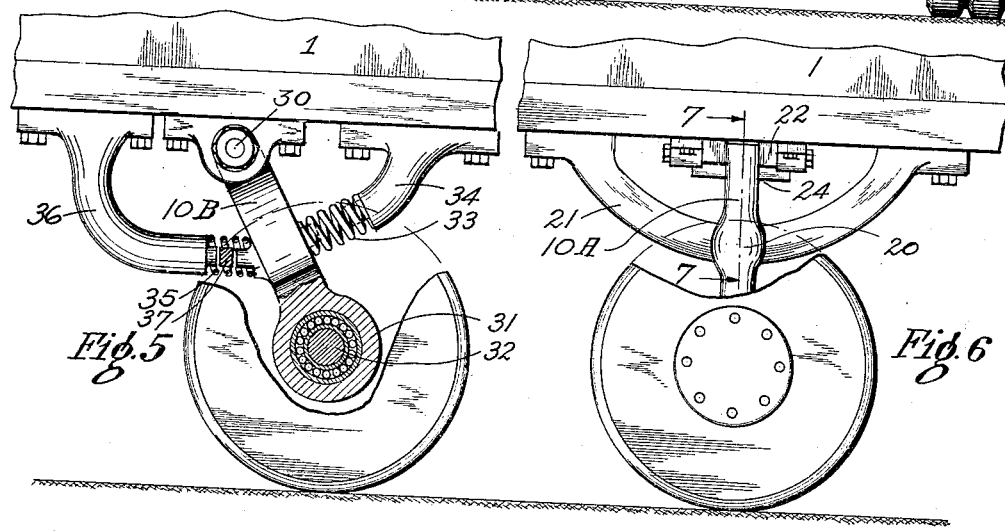
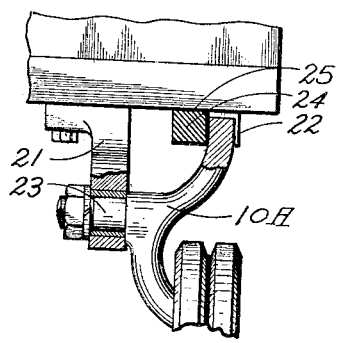
Inventor
DAVID R. THOMAS
By
Attorneys Patented Dec. 6, 1932

1,889,939

UNITED STATES PATENT OFFICE

DAVID R. THOMAS, OF CLEVELAND, OHIO

TRAILER

Application filed June 15, 1929. Serial No. 371,195.

This invention relates to trailers and more particularly to the rolling support for trailers which are intended to be drawn over highways as well as carried over railways. My invention is directed to the body supporting structure for such trailers disposed between the wheels and bodies thereof.

It is among the objects of my invention to provide rolling support for a trailer which will facilitate the trailer and its rolling support being carried bodily on a flat car; which will absorb road shocks when the trailer is drawn over highways; which will reduce the strains in the supporting parts due to road shocks; which will be rugged and durable and susceptible to economical construction.

Other objects will appear from the following description of a preferred form of my invention, reference being had to the accompanying drawings. The essential characteristics are summarized in the claims.

In the drawings, Fig. 1 is a diagrammatic side elevation of a trailer associated with a railroad car; Fig. 2 is a diagrammatic end elevation of the trailer and railroad car; Fig. 3 is an enlarged elevation partly in section of one form of the wheel supporting structure; Fig. 4 is a section taken along the broken line 4—4 of Fig. 3; Fig. 5 is a side elevation and an arrangement of parts constituting another form of wheel supporting structure; Fig. 6 is a modified form of the construction illustrated in Fig. 3; and Fig. 7 is a section taken along the lines 7—7 of Fig. 6.

To illustrate my invention, I have shown one adaptation of its use more or less diagrammatically in Figs. 1 and 2, wherein a trailer 1 having road wheels 2 and temporary supporting wheels 3 is shown positioned on a ramp 4 while a flat car 5 carried on the railroad rails 6 is run under the body of the trailer and between its road wheels. The trailer may be attached to a truck in the usual manner to be drawn over the highways but when it is desired to carry the trailer over railways, it is run onto the ramp, as illustrated, and thereafter the flat car 5 is run under the trailer and when both the flat car and the trailer are moved to the left, as indicated in Fig. 1, the trailer is lowered onto the flat car with its wheels clearing the railway road bed and is thus carried over the railway.

Referring particularly to Fig. 2, it will be observed that the usual solid axle which might extend directly between the road wheels 2 cannot be used in this construction and that in lieu of such axle, there must be provided wheel supporting means which will clear and avoid the body and truck of the railroad car. To this end, I provide struts 10 which are connected to the bottom of the trailer as at 11 and which carry means in the lower end for supporting the axle of the road wheels.

Referring particularly to Figs. 3 and 4, I illustrate one form of my invention wherein struts 10 are pivotally connected with the body of the trailer as at 11 by such means as a pin 12 extending through spaced bearings 13. The lower end of the strut 10 carries a sliding journal box 14 in which is received the journal or stub axle 15 of the road wheels. Resilient means such as springs 16 permit vertical displacement between the journal and the strut. As will appear from Fig. 3, when the trailer is being drawn over the highway, unevenness of the highway will cause not only vertical forces or shocks to be directed from the axle to the strut but such shocks will have a horizontal component which I propose to absorb by resilient means such as springs 17, which are borne between brackets 18 and the mid portion of the strut 10. Thus as the vehicle moves along the highway, vertical components of shocks are taken through the springs 16 and horizontal components of shocks are taken through the spring 17 while the strut oscillates within a limited range about the axis of the pin 12.

Were the strut 10 and brackets 18 strong enough to take the horizontal component of the shocks directly, their mass and strength would have to be usually great whereas by interposing resilient means and permitting the strut to oscillate slightly, the stress of the shock is largely absorbed in the springs or other cushioning means and the parts of the structure may be correspondingly reduced in mass and strength.

Referring to Fig. 6, I show a modified form of this construction wherein the strut 10A is pivoted, as at 20, in the pedestal 21 and carries the wheel axle in a manner similar to that described above, but not shown in Fig. 6. The upper end of the strut is engaged between resilient cushions 22 which may be of such material as vulcanized rubber so that a limited oscillation of the strut is permitted about its pivotal support 20. The result of this construction is similar to that above in that the wheel is permitted to move horizontally with relation to the body of the trailer as well as vertically under the influence of road shocks. In Fig. 7, I show the pivotal support for the strut 10A comprising a trunnion part 23 carried by bearings of the pedestal 21 which, it will be observed, is considerably offset from the wheels. To take care of the lateral thrust on the pedestal bearings, I secure a block 24 to the bottom of the trailer against which the upper end of the end of the strut 10A is laterally and slidably supported, as at 25.

Referring to Fig. 5, I show a further modification of my invention wherein the resiliently supported journal box or like construction is eliminated and wherein the one spring or its equivalent takes both the vertical and horizontal component of the road shocks while permitting the wheel to move both vertically and horizontally relative to the body of the trailer. In this arrangement, the strut 10B is inclined at the vertical and is pivotally secured to the body of the trailer as at 30 and forms at its lower end a bearing 31 in which is received the stub axle or journal 32 of the road wheel. Preferably about midway between the ends of the strut is a spring 33 which is compressed between the strut and bracket 34 by the wheel load. An auxiliary and rebound spring 35 is disposed between the opposite side of the strut and a bracket 36. Preferably a small block 37 of such material as rubber is disposed between the bracket 36 and the strut to more effectively limit clockwise movement of the strut about its pivot 30. The strut is intended to be inclined rearwardly with relation to the trailer so that when the trailer is drawn over the highway, the axis of the wheel is behind the pivotal connection between the strut and body so that road shocks are delivered generally normal to the strut and thence to the main spring 33.

While the foregoing constitutes a description of my invention in certain modified forms, I do not care to be limited to any specific showing, other than by the claims appended hereto.

I claim:—

1. A vehicle having a body and a wheel, the combination of an axle carried by the wheel, a depending strut resiliently engaging said axle and pivotally connected to said body and resilient means engaging said strut for limiting its movement relative to said body.

2. A vehicle having a body and a wheel, the combination of an axle carried by the wheel, a journal box for said axle, a depending strut slidably engaging said journal box and pivotally connected to said body and resilient means engaging said strut for limiting its movement relative to said body.

3. Vehicle body supporting means comprising a wheel, an axle, a strut pivotally connected to said body at its upper end and extending downwardly at an angle to the vertical and connected to said wheel and axle at its lower end and resilient means extending at right angles to the strut and engaging said strut in its mid portion for carrying at least part of the wheel load and limiting its pivotal movement relative to said body.

4. Vehicle body supporting means comprising a wheel having a stub axle, a strut having a bearing in its lower end and engaging said axle and having its upper end pivotally connected to the body of the vehicle, said strut being inclined at an angle to the vertical with its lower end rearwardly of its forward end, a spring engaging the rearward and upper side of the strut in its mid portion for carrying at least part of the wheel load.

5. Vehicle body supporting means comprising a wheel, an axle, a depending strut interposed between the body of the vehicle and said wheel and axle, said strut being inclined to the vertical with its lower end rearward of its upper end, a pair of brackets disposed respectively fore and aft to the point of connection between the upper end of the strut and the body of the vehicle, a relatively heavy spring engaged between said strut and the rearward of said brackets and a relatively light spring engaged between said strut and the forward of said brackets.

6. Vehicle body supporting means comprising a wheel having a stub axle, a strut having a bearing in its lower end and engaging said axle and having its upper end pivotally connected to the body of the vehicle, said strut being inclined at an angle to the vertical with its lower end rearwardly of its forward end, a spring engaging the rearward and upper side of the strut in its mid portion for carrying at least part of the wheel load, and means opposing said spring to limit the movement of said strut.

7. Vehicle body supporting means comprising a wheel, an axle, a depending strut interposed between the body of the vehicle and said wheel and axle, said strut being inclined to the vertical with its lower end rearward of its upper end, a pair of brackets disposed respectively fore and aft to the point of connection between the upper end of the strut and the body of the vehicle, a relatively heavy spring engaged between said strut and the rearward of said brackets, a relatively light spring engaged between said strut and the forward of said brackets, and means for limiting the extension of said relatively heavy spring other than the wheel load.

8. In a trailer adapted to be hauled over a highway and positioned on a ramp while a flat car carried on railroad rails is run under the body thereof and between its road wheels, the zone between the road wheels and the body and the ground being unobstructed, the combination of a unitary mounting for each of the road wheels which comprises an axle, an upright strut engaging the axle and being pivotally mounted with relation to the body, resilient means carried by the body and engaging said strut whereby oscillation of said strut about its pivotal connection with the body is resiliently resisted.

9. In a transportation system, a trailer adapted to be hauled over a highway and loaded on a railroad car, said trailer having at least two road wheels mounted aft of the body, wheel supporting means which will clear and avoid the body and truck of the railroad car, said wheel supporting means comprising struts depending from the aft part of the vehicle and on opposed sides thereof and being pivotally connected to the body of the vehicle, an axle carried by each of the wheels, said struts supporting said axles, and a resilient means engaging said struts and limiting their movement relative to the body.

10. In a transportation system which includes a trailer adapted to be coupled to another vehicle to be hauled over a highway and to be loaded on a flat car, said trailer having at least two road wheels mounted aft of the body and on opposed sides thereof, wheel supporting means which will avoid and clear the body and truck of the railroad car, said means comprising a strut mounted on each side of said vehicle and being pivotally connected to the body, an axle associated with each of said wheels, each of said struts being journaled to said axles, and resilient means engaging said strut between the body of the vehicle and the axle and acting generally normal to said strut, and absorbing from said member at least the horizontal components of road shocks received by said wheels.

In testimony whereof I hereunto affix my signature this fourteenth day of June, 1929.

DAVID R. THOMAS.